(12) United States Patent
Hildenbrand et al.

(10) Patent No.: US 6,906,463 B2
(45) Date of Patent: Jun. 14, 2005

(54) UV-REFLECTING LAYER, LAMP WITH SUCH A LAYER, AND METHOD OF PROVIDING SUCH A LAYER ON A LAMP GLASS

(75) Inventors: Volker Dirk Hildenbrand, Eindhoven (NL); Harald Glaeser, Aachen (DE); Cornelis Reinder Ronda, Aachen (DE); Claudia Mutter, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 243 days.

(21) Appl. No.: 09/974,476

(22) Filed: Oct. 10, 2001

(65) Prior Publication Data

US 2002/0101145 A1 Aug. 1, 2002

(30) Foreign Application Priority Data

Oct. 14, 2000 (DE) .......................... 100 51 124

(51) Int. Cl.$^7$ .......................... H01J 17/16; H01J 61/35
(52) U.S. Cl. .......................... 313/635; 313/112; 313/113
(58) Field of Search .................. 313/484, 485, 313/489, 634, 635, 112, 113; 501/54, 64

(56) References Cited

U.S. PATENT DOCUMENTS

| | | | |
|---|---|---|---|
| 3,995,192 A | | 11/1976 | Hammer ...................... 313/488 |
| 4,289,991 A | * | 9/1981 | Schreurs ...................... 313/489 |
| 4,521,524 A | * | 6/1985 | Yamashita .................... 501/64 |
| 5,258,689 A | * | 11/1993 | Jansma et al. ............... 313/489 |
| 5,619,096 A | * | 4/1997 | Kaliszewski et al. ........ 313/489 |
| 5,811,924 A | * | 9/1998 | Okumura et al. ............ 313/487 |
| 5,817,160 A | * | 10/1998 | Nagpal et al. ................ 65/17.3 |
| 6,281,625 B1 | * | 8/2001 | Tachibana et al. ........... 313/489 |
| 6,323,585 B1 | * | 11/2001 | Crane et al. ................. 313/112 |

* cited by examiner

*Primary Examiner*—Joseph Williams
*Assistant Examiner*—Kevin Quarterman

(57) ABSTRACT

In an UV-reflecting layer for discharge lamps, the layer comprises at least 0.1% by weight of $Al_2O_3$ and at least 0.1% by weight of a material having a higher refractive index than $Al_2O_3$, so that as large a proportion of UV light as possible can be reflected and as large a portion of visible light as possible can be emitted by the lamp.

6 Claims, 1 Drawing Sheet

| wt-% Alon C | S/S$_0$ wt-% | a |
|---|---|---|
| 0 | 1.00 | 1.040 |
| 10 | 1.34 | 1.030 |
| 20 | 1.38 | 1.003 |
| 30 | 1.48 | 1.003 |
| 40 | 1.18 | 1.000 |
| 50 | 1.39 | 1.000 |
| 60 | 1.17 | 1.000 |
| 70 | 0.92 | 1.000 |

| wt-% Alon C | $S/S_0$ wt-% | a |
|---|---|---|
| 0 | 1.00 | 1.040 |
| 10 | 1.34 | 1.030 |
| 20 | 1.38 | 1.003 |
| 30 | 1.48 | 1.003 |
| 40 | 1.18 | 1.000 |
| 50 | 1.39 | 1.000 |
| 60 | 1.17 | 1.000 |
| 70 | 0.92 | 1.000 |

UV-REFLECTING LAYER, LAMP WITH SUCH A LAYER, AND METHOD OF PROVIDING SUCH A LAYER ON A LAMP GLASS

The invention relates to an UV-reflecting layer, a lamp with such a layer, and a method of providing an UV-reflecting layer on a lamp.

Discharge lamps such as, for example, low-pressure mercury vapor discharge lamps involve the problem that the radiation generated in the discharge lies in a wavelength range, usually the UV range, which is not visible to the human eye. To generate visible light, therefore, this radiation is to be converted into radiation of different wavelengths. For this purpose, a layer of luminescent material such as, for example, a phosphor is provided on the inside wall of the discharge body, i.e. of that body in which the gas discharge takes place, which body is usually made of glass.

The luminescent material, however, is comparatively expensive and accounts for a far from negligible portion of the total cost of such a lamp. Efforts have accordingly been made for a long time to keep the layer of luminescent material (luminescent layer) as thin as possible. It is a known procedure to provide a second layer, which is permeable to visible light but which reflects UV light, between the luminescent layer and the inside of the discharge vessel so as to achieve that the radiation generated in the gas discharge can be converted into visible light to the highest extent possible, also with the use of a thin luminescent layer. This achieves that those portions of the radiation generated in the gas discharge which have already been converted into visible light during passing through the luminescent layer can leave the discharge body substantially unhampered, whereas those portions which have passed the luminescent layer without being converted into visible light through absorption and emission are at least partly reflected back to the luminescent layer by the reflecting layer. The basic idea is, therefore, to "lock in" the UV light in the discharge body and to reflect it back and forth until it has been absorbed by atoms of the luminescent layer, which atoms then emit wavelengths in the visible range.

The realization of a UV-reflecting layer which reflects UV radiation as fully as possible and at the same time allows wavelengths in the visible range to pass unhampered presents problems in practice. A wide variety of materials and material mixtures are suggested for the reflecting layer, for example in AT 353 357 C1, which proposes an UV-reflecting layer which is composed not exclusively of a material which reflects UV radiation well but also of such a material in a mixture with a luminescent material. U.S. Pat. No. 3,995, 192 proposes an UV-reflecting layer of $TiO_2$ to which up to 15% by weight, but preferably only a few tenths of a percent by weight (0.14 to 0.17% by weight) of $Al_2O_3$ or $ZrO_2$ is added. A reflection layer of two reflecting materials of different particle sizes is known from JP 53-63788 A2, where the one material has a particle size below 1 $\mu$m and accounts for approximately 95 to 99.9% by weight of the reflection layer, and the second material has a particle size of approximately 2 to 8 $\mu$m and accounts for approximately 0.1 to 5% by weight of the reflection layer. Such a mixture of materials is intended to safeguard most of all the adhesion and permanence of the reflection layer.

The materials and mixtures of materials known until now for the reflection layer, however, do not optimally fulfill the requirements imposed on the reflection layer. It is indeed known that the use of reflecting materials with a high refractive index and a suitable particle size may have the result that the undesirable scattering of the visible light can be reduced without at the same time reducing the desired reflection of the UV light, but materials with a high refractive index also have the capability of absorbing UV light without emitting light in the visible range after the absorption. The energy of the absorbed radiation, accordingly, remains unused.

In view of the above, the invention has for its object to provide an UV-reflecting layer, a lamp provided with such a layer, and a method of providing such a layer on a lamp, such that the layer has very good UV-reflection properties and at the same time very good transmission properties for visible light, in particular scattering visible light to the lowest extent possible, so that the scattering contrast is improved.

This object is achieved by means of a layer, a lamp, and a method having the characteristics of the independent claims. Advantageous embodiments and modifications are defined in the dependent claims.

The invention is based on the recognition that it is possible to reduce the effective path length of the visible light through the layer through mixing of materials having a high and having a low refractive index, so that less visible light is absorbed, without reducing the proportion of reflected UV light.

When UV-absorbing particles having the optimum scattering power are embedded in a matrix of weakly-scattering nanoparticles of non-UV-absorbing material, the scattering coefficient of the entire layer remains the same or even rises, whereas the absorption is reduced.

The following relation holds:

$$a = 1 + K/S$$

in which S is the scattering coefficient and K the absorption coefficient of the entire layer for light having a given wavelength. It is true that:

$$K = k\sigma$$

in which K is a constant and $\sigma$ is the proportional volume of the larger particles in the layer.

If mixtures of particles with sizes corresponding to the optimum scattering power are diluted with non-absorbing particles which are significantly smaller than 254 Nm, the scattering factor S of such a layer will depend on the proportional volume $\sigma$ of the larger particles. This effect is given by $$S = s\sigma(1 - \gamma s \sigma^{2/3})$$

in which s is defined as $$s = \frac{ds}{d\sigma}\bigg|_{\sigma \to 0}$$

$\gamma$ is dependent on the manner in which the particles are packed. It is known for pigments in polymers that the optimum proportional volume for scattering lies at approximately 30% by volume.

The scattering coefficient S and the parameter a may be calculated from reflection data of layers having various layer thicknesses. The scattering coefficients and the corresponding values of layers of aluminum particles with a specific surface area of 100 $m^2/g$ and doped $ZrO_2$ have been listed in the Table of FIG. 1. The values relate to a fluoropolymer standard. The scattering coefficients are standardized to the scattering coefficients of unmixed $ZrO_2$.

The value of the parameter a decreases as the content of nanocrystalline $Al_2O_3$ increases and tends towards one at 0.4% by weight of nanoparticles. This recipe renders possible the use of materials with a higher refractive index than $Al_2O_3$, and thus with a higher scattering contrast for UV-reflecting layers. Besides doped $ZrO_2$, particles of $ZrO_2$, yttrium oxide, hafnium oxide, and the oxides of rare earths may also be used. The principle is also applicable to other wavelengths if the particle sizes and the absorption limit are suitably chosen.

The reflection layer may be provided, for example, by a wet-chemical method. For this purpose, a mixture of nanoparticles and strongly light-scattering particles may be stabilized in water by means of nitric acid or other dispersing agents. After a suitable binder system has been added, a layer of the reflector material may be provided, and a layer of the luminescent material in a next step. The achievable reflectivity in relation to a fluoropolymer standard can be set between 70 and approximately 100% for the example given through a suitable choice of the mixing ratios.

If the particle size of the $Al_2O_3$ is kept significantly below 254 nm, preferably below 10 nm, an embedding in a nanocrystalline structure can be realized in a simple manner. It is obvious that not all the $Al_2O_3$ need be of nanocrystalline structure. It may suffice here—depending on the concrete embodiment—that the average particle size of the $Al_2O_3$ is chosen to lie below 100 nm, preferably below 30 nm. Since such particles as a rule tend to join together into agglomerates, it is advantageous if these agglomerates on average are less than 200 nm, preferably less than 140 nm large.

What is claimed is:

1. An UV-reflecting layer, in particular for discharge lamps, the layer comprising at least 10% by weight of $Al_2O_3$, and at least 10% by weight of a material having a higher refractive index than $Al_{2-l}O_3$, characterized in that the $Al_2O_3$ is chosen to have a particle size below 254 nm for more than 90% by weight of the $Al_2O_3$.

2. A layer as claimed in claim 1, characterized in that the $Al_2O_3$ particles have an average particle diameter below 100 nm, which primary particles, if joining together into aggregates, form aggregates below 200 nm in size.

3. A gas discharge lamp with a discharge body on whose inside surface a layer of UV-light-reflecting material is provided, the layer comprises at least 10% by weight of $Al_2O_3$, and at least 10% by weight of a material having a higher refractive index than $Al_2O_3$, characterized in that the $Al_2O_3$ is chosen to have a particle size below 254 nm for more than 90% by weight of the $Al_2O_3$.

4. A lamp as claimed in claim 3, characterized in that the $Al_2O_3$ particles have an average particle diameter below 100 nm, which primary particles, if joining together into aggregates, form aggregates below 200 nm in size.

5. A layer as claimed in claim 2, characterized in that the $Al_2O_3$ particles have an average particle diameter below 30 nm, which primary particles, if joining together into aggregates, form aggregates below 140 nm in size.

6. A lamp as claimed in claim 4, characterized in that the $Al_2O_3$ particles have an average particle diameter below 30 nm, which primary particles, if joining together into aggregates, form aggregates below 140 nm in size.

* * * * *